(12) United States Patent
Tandai et al.

(10) Patent No.: US 10,078,960 B2
(45) Date of Patent: Sep. 18, 2018

(54) COMMUNICATION DEVICE AND COMMUNICATION METHOD

(71) Applicant: Kabushiki Kaisha Toshiba, Minato-ku (JP)

(72) Inventors: Tomoya Tandai, Ota (JP); Daisuke Uchida, Kawasaki (JP); Tsuyoshi Kogawa, Kawasaki (JP); Tomoko Adachi, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 48 days.

(21) Appl. No.: 15/449,382

(22) Filed: Mar. 3, 2017

(65) Prior Publication Data

US 2017/0347367 A1 Nov. 30, 2017

(30) Foreign Application Priority Data

May 31, 2016 (JP) .................................. 2016-108896

(51) Int. Cl.
*H04B 7/00* (2006.01)
*G08G 1/01* (2006.01)
(Continued)

(52) U.S. Cl.
CPC ......... *G08G 1/0141* (2013.01); *G08G 1/0112* (2013.01); *G08G 1/0116* (2013.01);
(Continued)

(58) Field of Classification Search
CPC ..... H04W 80/04; H04W 84/12; H04W 88/06; H04W 88/08; H04W 84/18; H04W 74/08; H04L 2012/5608
(Continued)

(56) References Cited

U.S. PATENT DOCUMENTS 8,185,296 B2 * 5/2012 Yokoyama ............. G08G 1/052
 701/117
8,289,186 B2 10/2012 Osafune
(Continued)

FOREIGN PATENT DOCUMENTS

JP 2000-332679 A 11/2000
JP 4960057 B2 6/2012
(Continued)

OTHER PUBLICATIONS

Chunxiao Li, et al., "A Travel-Efficient Driving Assistance Scheme in VANETs by Providing Recommended Speed" IEICE Trans. Fundamentals, vol. E96-A, No. 10, XP001585646, Oct. 2013 pp. 2007-2015.

*Primary Examiner* — Brenda H Pham
(74) *Attorney, Agent, or Firm* — Oblon, McClelland, Maier & Neustadt, L.L.P.

(57) ABSTRACT

According to an embodiment, a communication device is provided in a movable body and is wirelessly communicable with a transceiver unit and another movable body. A receiver of the device receives transceiver unit information including traffic-light information that the transceiver unit has transmitted to a predetermined channel. An processing circuitry extracts the traffic-light information corresponding to a running direction of the movable body from the transceiver unit information. A transmitter transmits movable body information of the movable body to the predetermined channel. A processing circuitry controls a transmission timing of the movable body information such that a transmission control period becomes a preset first time. A processing circuitry changes the transmission control period to a second time longer than the first time, when the traffic-light information with respect to the running direction indicates a
(Continued)

stopping command, and a speed of the movable body is a preset speed or less.

16 Claims, 12 Drawing Sheets

(51) Int. Cl.

| | | |
|---|---|---|
| *H04L 29/08* | (2006.01) | |
| *G08G 1/056* | (2006.01) | |
| *G08G 1/095* | (2006.01) | |
| *G08G 1/052* | (2006.01) | |
| *H04W 4/70* | (2018.01) | |
| *H04W 4/00* | (2018.01) | |
| *H04W 4/04* | (2009.01) | |

(52) U.S. Cl.
CPC ............. *G08G 1/052* (2013.01); *G08G 1/056* (2013.01); *G08G 1/095* (2013.01); *H04L 67/12* (2013.01); *H04W 4/005* (2013.01); *H04W 4/046* (2013.01); *H04W 4/70* (2018.02); *G08G 1/01* (2013.01)

(58) Field of Classification Search
USPC .............................. 370/328, 310.2, 338, 349
See application file for complete search history.

(56) References Cited

U.S. PATENT DOCUMENTS

| 8,772,960 B2 * | 7/2014 | Yoshida | H02J 50/12 |
|---|---|---|---|
| | | | 307/9.1 |
| 2012/0238222 A1 | 9/2012 | Nakaoka et al. | |
| 2014/0126557 A1 | 5/2014 | Kasslatter et al. | |
| 2015/0304954 A1 | 10/2015 | Korenaga et al. | |

FOREIGN PATENT DOCUMENTS

| JP | 2014-119925 A | 6/2014 |
|---|---|---|
| WO | WO 2011/037161 A1 | 3/2011 |

\* cited by examiner

COMMUNICATION DEVICE AND COMMUNICATION METHOD

CROSS-REFERENCE TO RELATED APPLICATIONS

This application is based upon and claims the benefit of priority from Japanese Patent Application No. 2016-108896, filed on May 31, 2016; the entire contents of which are incorporated herein by reference.

FIELD

Embodiments described herein relate generally to a communication device and a communication method.

BACKGROUND

There has been known a traffic control system for improving smooth running of vehicles at an intersection or the like. In the traffic control system, a roadside unit that wirelessly transmits roadside unit information is installed at an intersection. The roadside unit information includes traffic-light information representing a command (a stopping command or a running command) provided to the vehicles by a traffic light. Each of the vehicles can control its own running in response to the command provided by the traffic light by receiving the roadside unit information from the roadside unit.

In the traffic control system, a vehicle wirelessly transmits vehicle information including the running state and the like of the vehicle to other vehicles, and wirelessly receives vehicle information including the running state of other vehicles from these vehicles. Due to this configuration, the vehicle can notify other vehicles behind of the running state of the vehicle, and can control the running of the vehicle corresponding to the running state of other vehicles in front.

In the traffic control system, the roadside unit and vehicles transmit information to the same channel (the same frequency band). Therefore, if a plurality of vehicles simultaneously transmit information, an interference occurs. Accordingly, any vehicle cannot receive the information from the roadside unit. For example, when many vehicles are stopping, there is a high possibility of occurrence of an interference.

For example, a traffic light provides a stopping command at an intersection, and the vehicles stop. Therefore, the number of vehicles increases at the intersection, thereby increasing the possibility of a vehicle information interference. Further, at the intersection, the roadside unit information including the traffic-light information is transmitted. Because the traffic-light information is important, it is desired that the vehicle can receive the roadside unit information at a higher rate. However, if there are many vehicles that are stopping due to a stopping command of the traffic light, there is a lower probability that the vehicles can receive the roadside unit information.

DETAILED DESCRIPTION

According to an embodiment, a communication device is provided in a movable body and is wirelessly communicable with a transceiver unit and with another movable body via a predetermined channel. The communication device includes a receiver, a transmitter, processing circuitry. The receiver receives transceiver unit information including traffic-light information that the transceiver unit has transmitted to the predetermined channel. The transmitter transmits movable body information on the movable body to the predetermined channel. The processing circuitry extracts the traffic-light information corresponding to a running direction of the movable body from the transceiver unit information. The processing circuitry. The processing circuitry controls a transmission timing of the movable body information in such a manner that a transmission control period becomes a preset first time. The processing circuitry changes the transmission control period to a second time that is longer than the first time, when the traffic-light information with respect to the running direction of the movable body indicates a stopping command, and a speed of the movable body is equal to or lower than a preset speed.

A traffic control system 10 according to an embodiment is described below in detail with reference to the drawings. An object of the traffic control system 10 according to the present embodiment is to improve the reception success rate of information at an intersection.

Figure 1:
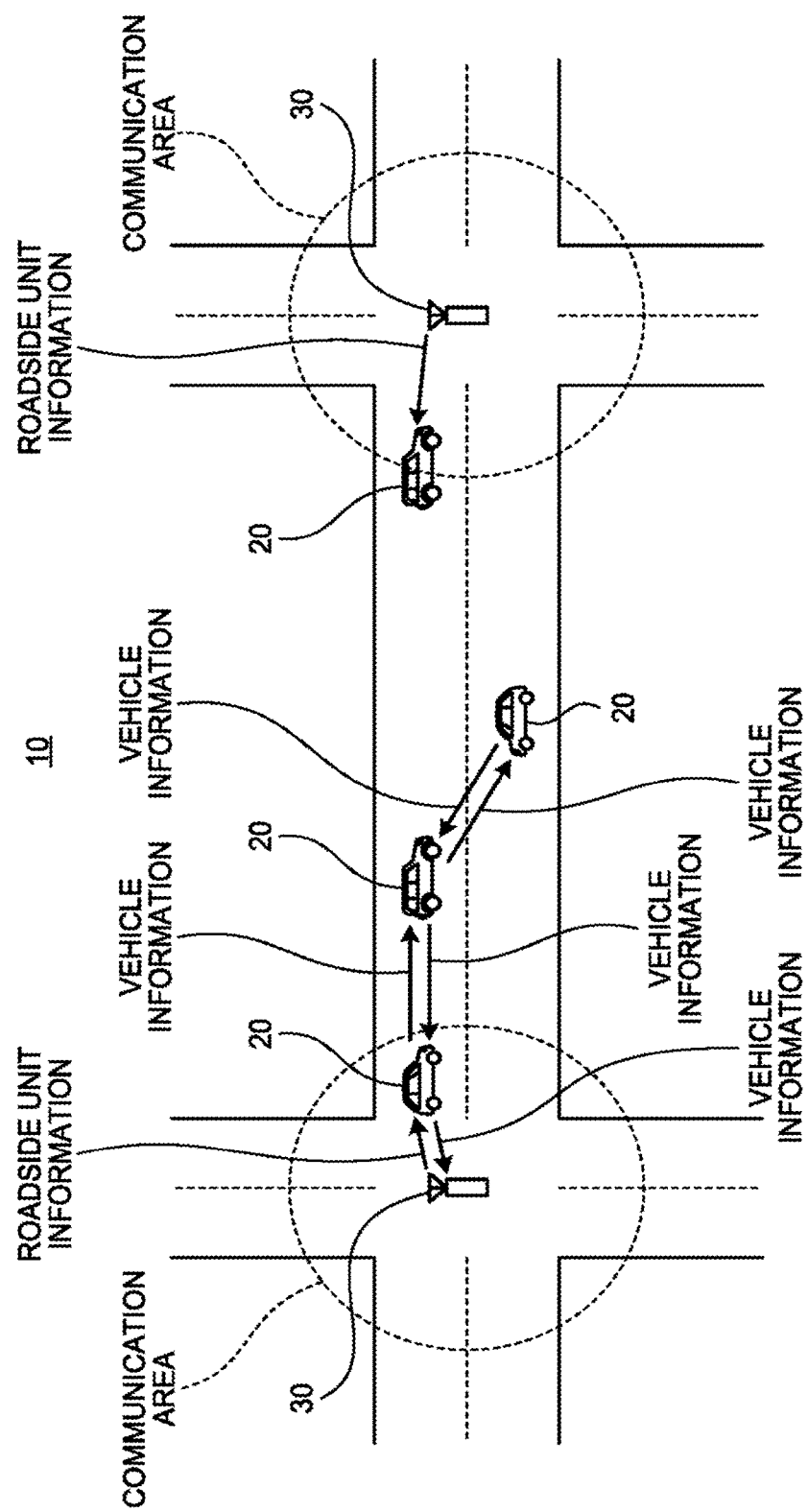
FIG. 1 is a diagram schematically illustrating a traffic control system.
Figure 2:
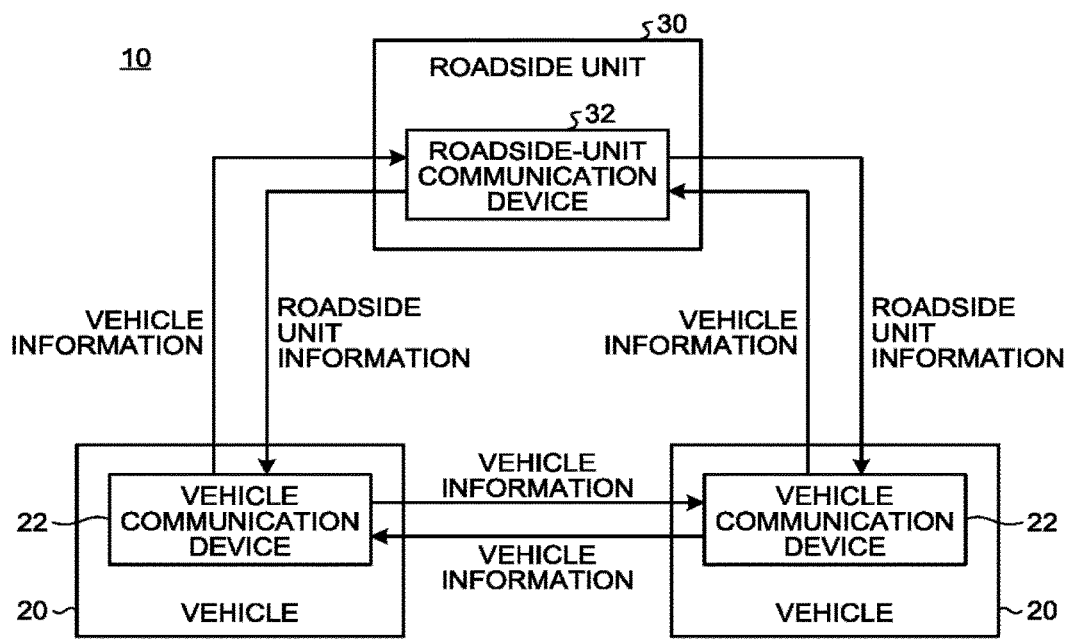
FIG. 2 is a block diagram illustrating a configuration of the traffic control system.

FIG. 1 is a diagram schematically illustrating the traffic control system 10 according to an embodiment. FIG. 2 is a block diagram illustrating a configuration of the traffic control system 10 according to the embodiment.

The traffic control system 10 according to the present embodiment includes a plurality of vehicles 20 and at least one roadside unit 30. The vehicle 20 is a movable body that runs on a road, and is an automobile, a motorcycle, and a bicycle, for example. The roadside unit 30 is, for example, a device that is installed on the outside of the road. The roadside unit 30 is installed, for example, corresponding to an intersection including a traffic light.

The vehicle 20 includes a vehicle communication device 22. The roadside unit 30 includes a roadside-unit communication device 32. The vehicle communication device 22 and the roadside-unit communication device 32 can communicate information with each other wirelessly via radio waves.

The vehicle communication device 22 and the roadside-unit communication device 32 transmit and receive information to and from a common channel (a common frequency band) with a common method. The vehicle communication device 22 and the roadside-unit communication device 32 encode and modulate information to be transmitted with a preset method, and wirelessly transmit the information to a predetermined channel at a transmission timing set by the device itself. The information wirelessly transmitted by the vehicle communication device 22 and the roadside-unit communication device 32 is broadcasted to the predetermined channel, and received by other devices located in a communication area.

The vehicle communication device 22 and the roadside-unit communication device 32 become a reception stand-by state where information wirelessly transmitted from other devices to a predetermined channel can be received, in a period other than the transmission timing set by the device itself. The vehicle communication device 22 and the roadside-unit communication device 32 can receive information from other devices, when the information is transmitted to the predetermined channel from other devices in the period other than the transmission timing set by the device itself.

However, when a plurality of vehicle communication devices 22 transmit information at the same timing, or the vehicle communication device 22 and the roadside-unit communication device 32 transmit information at the same timing, the vehicle communication device 22 (or the roadside-unit communication device 32), which is present at a position where it is possible to receive the information transmitted from the both devices, cannot receive available information due to an interference.

The roadside-unit communication device 32 transmits roadside unit information including traffic-light information and the like. The traffic-light information represents a command provided to passing vehicles 20 by a traffic light installed at a corresponding intersection. More specifically, the traffic-light information includes a command provided to the passing vehicles 20 and running directions (orientations) of the vehicles 20 to which the command is provided. The command is, for example, a stopping command instructing to stop, and a running command instructing to run. Further, the traffic-light information can include a remaining time until switching to the next command is performed. There may be a case where a plurality of traffic lights are provided in one intersection. In this case, the roadside unit information includes traffic-light information for each of the traffic lights.

The vehicle communication device 22 receives the roadside unit information transmitted from the roadside-unit communication device 32. Accordingly, the vehicle communication device 22 can cause a vehicle control device provided in the vehicle 20 itself to acquire traffic-light information and the like included in the roadside unit information. The vehicle control device having acquired the traffic-light information can notify a driver of the traffic-light information and can control running by using the traffic-light information.

The vehicle communication device 22 transmits the vehicle information including the running state of the vehicle, the position of the vehicle, the running direction of the vehicle, and the like. The running state includes, for example, information indicating whether the vehicle 20 is stopping or moving, the moving speed, and acceleration.

The vehicle communication device 22 receives the vehicle information transmitted from other vehicles. Accordingly, the vehicle communication device 22 can cause a vehicle control device included in the vehicle to acquire the running state, the position, and the running direction included in the vehicle information transmitted from other vehicles. The vehicle control device having acquired the running state, the position, and the running direction of other vehicles can notify the driver of the running state and the like of other vehicles 20, and can control running according to the running state and the like of the other vehicles 20.

The roadside-unit communication device 32 receives the vehicle information transmitted from the vehicle communication device 22. Accordingly, the roadside-unit communication device 32 can collect the running information and the like of the vehicles 20 passing the corresponding intersection.

Further, in the traffic control system 10, the communication area in which the respective roadside-unit communication devices 32 can transmit the roadside unit information (the area in which the vehicle 20 can receive the roadside unit information) is adjusted so as not to overlap on the communication area of other roadside-unit communication devices 32. For example, the signal strength of the respective roadside-unit communication devices 32 is adjusted so that the roadside unit information can be transmitted to the vehicles 20 within a range of several tens of meters.

A plurality of roadside-unit communication devices 32 transmit the roadside unit information synchronously with each other. That is, the roadside-unit communication devices 32 transmit the roadside unit information at the same timing. Further, the roadside-unit communication devices 32 transmit the roadside unit information, for example, periodically (for example, for every 100 milliseconds). Therefore, when the vehicle communication device 22 receives the roadside unit information from one roadside-unit communication device 32 and detects a receivable timing of the roadside unit information, the vehicle communication device 22 can specify the timing at which all the roadside-unit communication devices 32 transmit the roadside unit information (that is, the receivable timing of the roadside unit information), by counting a system clock or the like thereafter.

Furthermore, the vehicle communication device 22 transmits the vehicle information with a set transmission control period. However, the vehicle communication device 22 adds a random waiting time to the transmission interval of the vehicle information (random back-off transmission based on Carrier Sense Multiple Access/Collision Avoidance (CSMA/CA) specified by IEEE 802.11 wireless LAN). Accordingly, the vehicle communication device 22 transmits the vehicle information on average with the set transmission control period. However, the vehicle communication device 22 changes the transmission interval of individual pieces of vehicle information at random by a minute time. Therefore, even if the vehicle communication device 22 transmits the vehicle information simultaneously with other vehicle communication devices 22, the vehicle communication device 22 can transmit the next vehicle information at a timing different from other vehicle communication devices 22 with a high probability. In this manner, the traffic control system 10 reduces the probability of simultaneous transmission of the vehicle information by two vehicle communication devices 22 continuously for plural times. If the probability of simultaneous transmission of the vehicle information by two vehicle communication devices 22 continuously for plural times can be reduced, the vehicle communication device 22 can add any time to the transmission interval of the vehicle information, and for example, the vehicle communication device 22 can add or subtract a time fluctuating at random (jitters) or the like.

Figure 3:
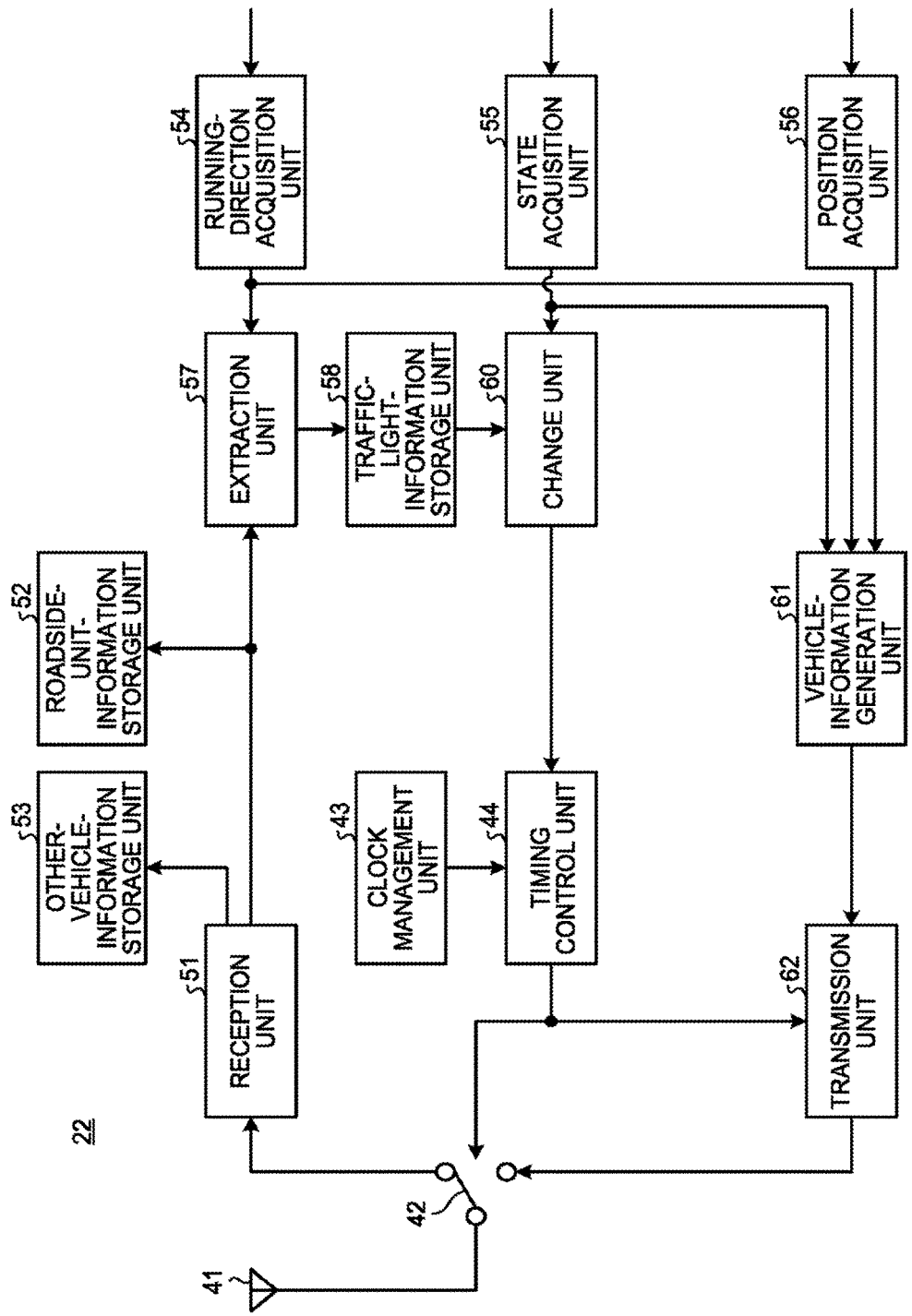
FIG. 3 is a functional configuration diagram of a vehicle communication device according to an embodiment.

FIG. 3 is a functional configuration diagram of the vehicle communication device 22 according to the present embodiment. The vehicle communication device 22 includes an antenna 41, a switch 42, a clock management unit 43, a timing control unit 44, a reception unit 51, a roadside-unit-information storage unit 52, an other-vehicle-information storage unit 53, a running-direction acquisition unit 54, a state acquisition unit 55, a position acquisition unit 56, an extraction unit 57, a traffic-light-information storage unit 58, a change unit 60, a vehicle-information generation unit 61, and a transmission unit 62.

The antenna 41 emits electronic waves to a predetermined channel. The antenna 41 also acquires the electronic waves that propagate in a predetermined channel.

The switch 42 connects the transmission unit 69 with the antenna 41 at a transmission timing designated by the timing control unit 44, and causes the signal output from the transmission unit 62 to be sent out to a predetermined channel via the antenna 41. The switch 42 connects the reception unit 51 with the antenna 41 in a reception period (a period other than the transmission timing) to supply the signal acquired from the antenna 41 to the reception unit 51.

The clock management unit 43 generates, for example, a system clock. The timing control unit 44 controls the transmission timing in such a manner that the vehicle information is transmitted with the set transmission control period, based on the system clock. More specifically, the timing control unit controls the transmission timing of the vehicle information in such a manner that the transmission control period becomes a preset first time at a normal time. Further, upon reception of a change instruction of the interval from the change unit 60, the timing control unit 44 controls the transmission timing in such a manner that the transmission control period becomes a second time longer than the first time.

Furthermore, the timing control unit 44 adds a random waiting time to the transmission interval of the vehicle information. For example, the timing control unit 44 adds a random time length to the set transmission control period (the first time or the second time), to shift the transmission timing of an individual piece of vehicle information at random. The timing control unit 44 then connects the antenna 41 with the transmission unit 62 at the transmission timing, and causes the transmission unit 62 to transmit the vehicle information about the vehicle.

The reception unit 51 receives information from a predetermined channel via the antenna 41 in the period other than the transmission timing designated by the timing control unit 44. The reception unit 51 receives the roadside unit information transmitted to the predetermined channel by the roadside-unit communication device 32 of the roadside unit 30. The reception unit 51 also receives the vehicle information transmitted to the predetermined channel by the vehicle communication device 22 of other vehicles.

The roadside-unit-information storage unit 52 stores therein the roadside unit information received by the reception unit 51. Accordingly, the roadside-unit-information storage unit 52 can provide traffic-light information of the roadside unit 30 and the like to the vehicle control device.

The other-vehicle-information storage unit 53 stores therein the vehicle information received by the reception unit 51. Accordingly, the other-vehicle-information storage unit 53 can provide the running state, the position, and the like of other vehicles to the vehicle control device.

The running-direction acquisition unit 54 acquires the running direction (the orientation) of the vehicle. The running-direction acquisition unit 54 acquires the running direction of the vehicle from an orientation sensor or the like provided in the vehicle 20.

The state acquisition unit 55 acquires the running state of the vehicle. The running state of the vehicle is, for example, whether the vehicles 20 is stopping or moving, the moving speed, acceleration, and the like. The state acquisition unit 55 acquires the running state from the vehicle control device.

The position acquisition unit 56 acquires the position of the vehicle. The position acquisition unit 56 acquires the position from the position detection device using, for example, a GPS system provided in the vehicle 20. The position is a latitude and a longitude of the vehicle 20. The position can also include an altitude.

The extraction unit 57 extracts the traffic-light information corresponding to the running direction of the vehicle from the roadside unit information received from the roadside unit 30. The roadside unit information includes the traffic-light information of the traffic lights with respect to a plurality of running directions. The extraction unit 57 extracts the information expressed by the traffic light with respect to the running direction of the vehicle acquired by the running-direction acquisition unit 54, of the traffic lights with respect to the plurality of running directions.

The traffic-light-information storage unit 58 stores therein the traffic-light information expressed by the traffic light with respect to the running direction of the vehicle, which has been extracted by the extraction unit 57. The traffic-light-information storage unit 58 overwrites and stores the traffic-light information therein, every time new roadside unit information is received.

The change unit 60 sets the transmission control period of the vehicle information in the timing control unit 44. Specifically, the change unit 60 sets the first time as the basic transmission control period. The change unit 60 then changes the transmission control period to the second time, which is longer than the first time, if the traffic-light information with respect to the running direction of the vehicle indicates a stopping command and the speed of the vehicle is equal to or lower than a preset speed.

The change unit 60 determines whether the traffic-light information with respect to the running direction of the vehicle indicates the stopping command, based on the information stored in the traffic-light-information storage unit 58. The change unit 60 determines whether the speed of the vehicle is equal to or lower than a preset speed, based on an acquisition result of the state acquisition unit 55.

The preset speed here can be a low speed, for example, that can be regarded that the vehicle is substantially stopping. For example, the speed can be equal to or lower than 5 kilometers per hour.

In the present embodiment, the preset speed is 0 kilometer per hour. That is, the change unit 60 changes the transmission control period of the vehicle information from the first time to the second time longer than the first time, when the traffic-light information with respect to the running direction of the vehicle indicates the stopping command and the vehicle is stopping. In this manner, by changing the transmission control period of the vehicle information from the first time to the second time, the change unit 60 can reduce the transmission frequency per hour of the vehicle information.

The vehicle-information generation unit 61 generates the vehicle information about the vehicle. The vehicle-information generation unit 61 generates the vehicle information including, for example, the running state of the vehicle acquired by the state acquisition unit 55, the position of the vehicle acquired by the position acquisition unit 56, the running direction acquired by the running-direction acquisition unit 54, and the like.

The transmission unit 62 transmits the vehicle information about the vehicle generated by the vehicle-information generation unit 61 to a predetermined channel via the antenna 41, at the transmission timing designated by the timing control unit 44.

Figure 4:
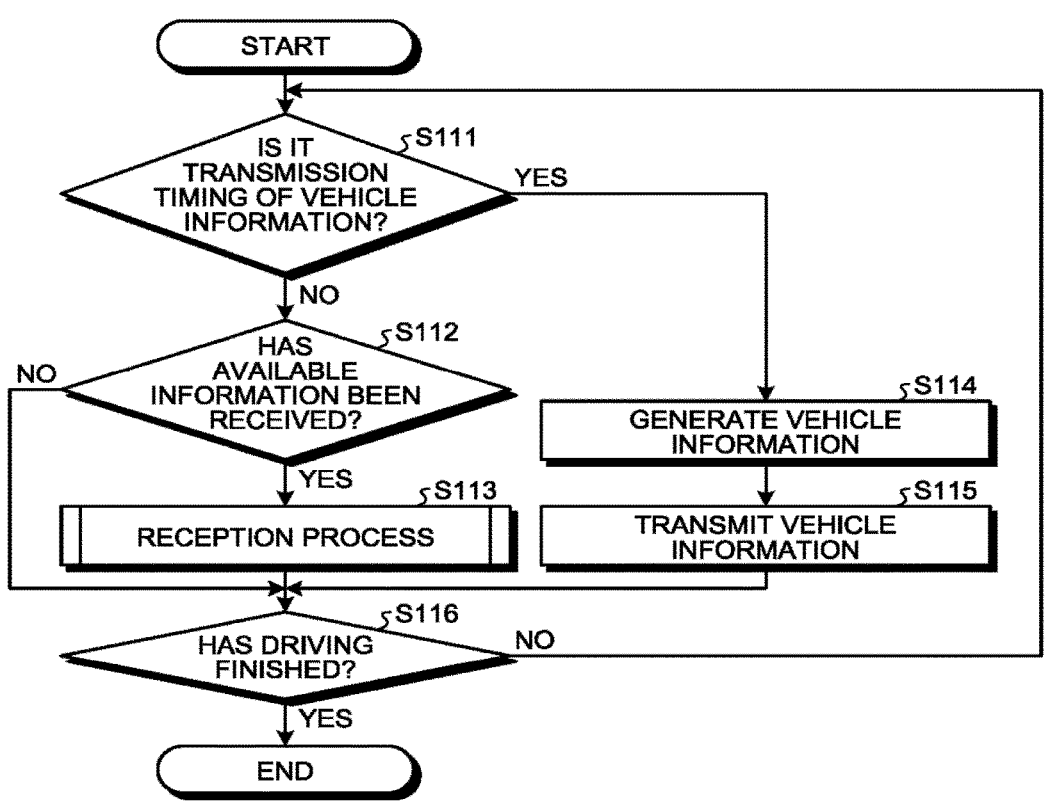
FIG. 4 is a flowchart of processes of the vehicle communication device.

FIG. 4 is a flowchart illustrating a processing flow of the vehicle communication device 22 according to the present embodiment. The vehicle communication device 22 performs the process according to the flow illustrated in FIG. 4, after start of driving of the vehicle.

First, at S111, the vehicle communication device 22 determines whether it is a transmission timing of the vehicle information about the vehicle. If it is not the transmission timing of the vehicle information about the vehicle (NO at S111), the vehicle communication device 22 forwards the process to S112. At S112, the vehicle communication device 22 determines whether available information has been able to be received. For example, the vehicle communication device 22 determines whether a signal having a strength equal to or higher than a predetermined strength has been able to be received. If the available information has not been able to be received (NO at S112), the vehicle communication device 22 forwards the process to S116. If the available information has been able to be received (YES at S112), the vehicle communication device 22 forwards the process to S113.

At S113, the vehicle communication device 22 performs a reception process. The reception process is described later with reference to FIG. 5. When the reception process has finished, the vehicle communication device 22 forwards the process to S116.

On the other hand, if it is the transmission timing of the vehicle information about the vehicle (YES at Sill), the vehicle communication device 22 forwards the process to S114. At S114, the vehicle communication device 22 generates the vehicle information about the vehicle. More specifically, the vehicle communication device 22 generates the vehicle information including the running state of the vehicle, the position of the vehicle, the running direction of the vehicle, and the like. Subsequently, at S115, the vehicle communication device 22 transmits the vehicle information about the vehicle to the predetermined channel. Upon transmission of the vehicle information, the vehicle communication device 22 forwards the process to S116.

At S116, the vehicle communication device 22 determines whether driving has finished. If driving has finished (YES at S116), the vehicle communication device 22 finishes this flow. If driving has not finished (NO at S116), the vehicle communication device 22 returns the process to S111 to repeat the process from S111.

Figure 5:
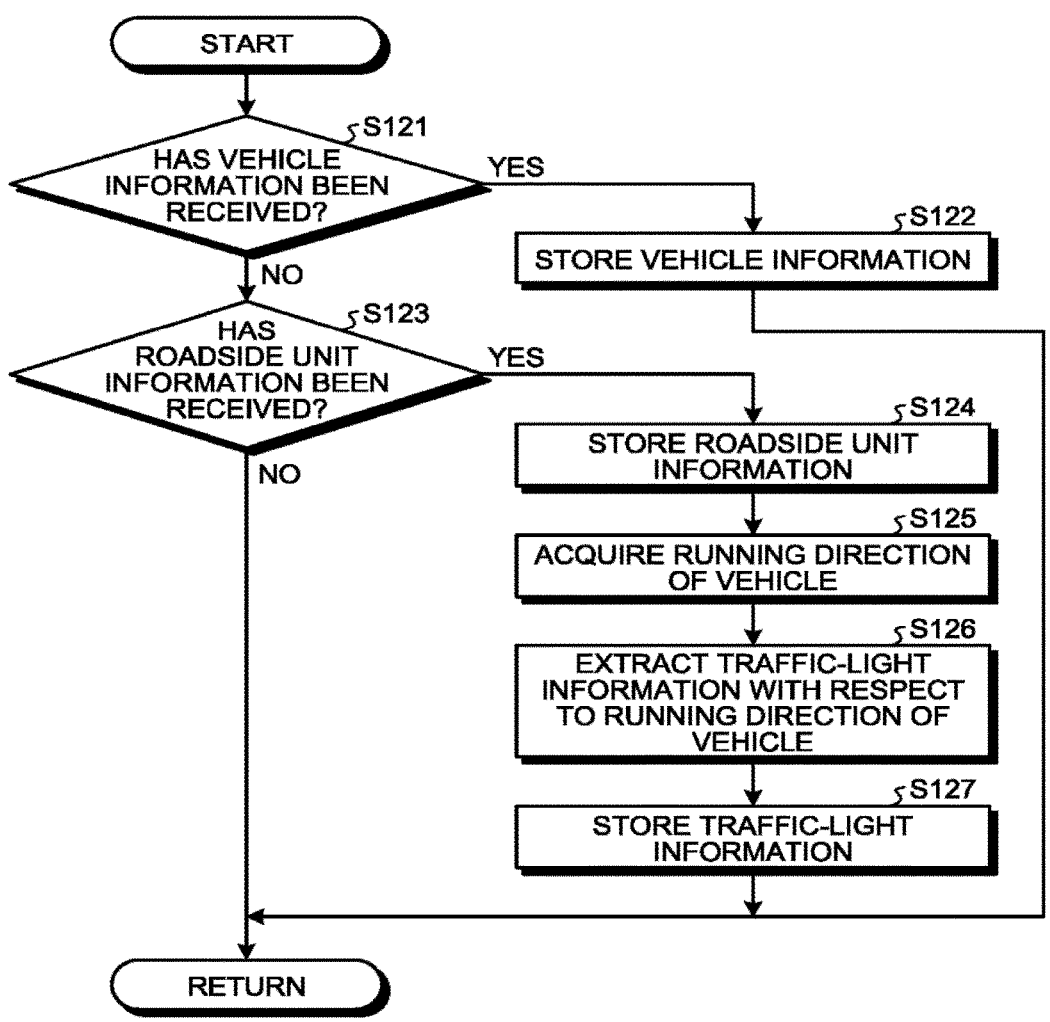
FIG. 5 is a flowchart of a reception process.

FIG. 5 is a flowchart illustrating the reception process in the vehicle communication device 22 according to the present embodiment. The vehicle communication device 22 performs the process according to the flow illustrated in FIG. 5, at S113 in FIG. 4.

First, at S121, the vehicle communication device 22 determines whether the vehicle information about another vehicle has been received. If the vehicle information about the another vehicle has been received (YES at S121), the vehicle communication device 22 forwards the process to S122.

At S122, the vehicle communication device 22 stores the received vehicle information about the another vehicle. When the process at S122 is finished, the vehicle communication device 22 finishes this flow, and returns to the process in FIG. 4.

If the vehicle information about the another vehicle has not been received (NO at S121), the vehicle communication device 22 determines whether the roadside unit information has been received at S123. If the roadside unit information has been received (YES at S123), the vehicle communication device 22 forwards the process to S124. If the roadside unit information has not been received (NO at S123), the vehicle communication device 22 finishes this flow, and return to the process in FIG. 4.

At S124, the vehicle communication device 22 stores therein the received roadside unit information. Next, at S125, the vehicle communication device 22 acquires the running direction of the vehicle. Subsequently, at S126, the vehicle communication device 22 extracts the traffic-light information corresponding to the running direction of the vehicle. Next, at S127, the vehicle communication device 22 stores the extracted traffic-light information in the traffic-light-information storage unit 58. When the process at S127 is finished, the vehicle communication device 22 finishes this flow, and returns to the process in FIG. 4.

Figure 6:
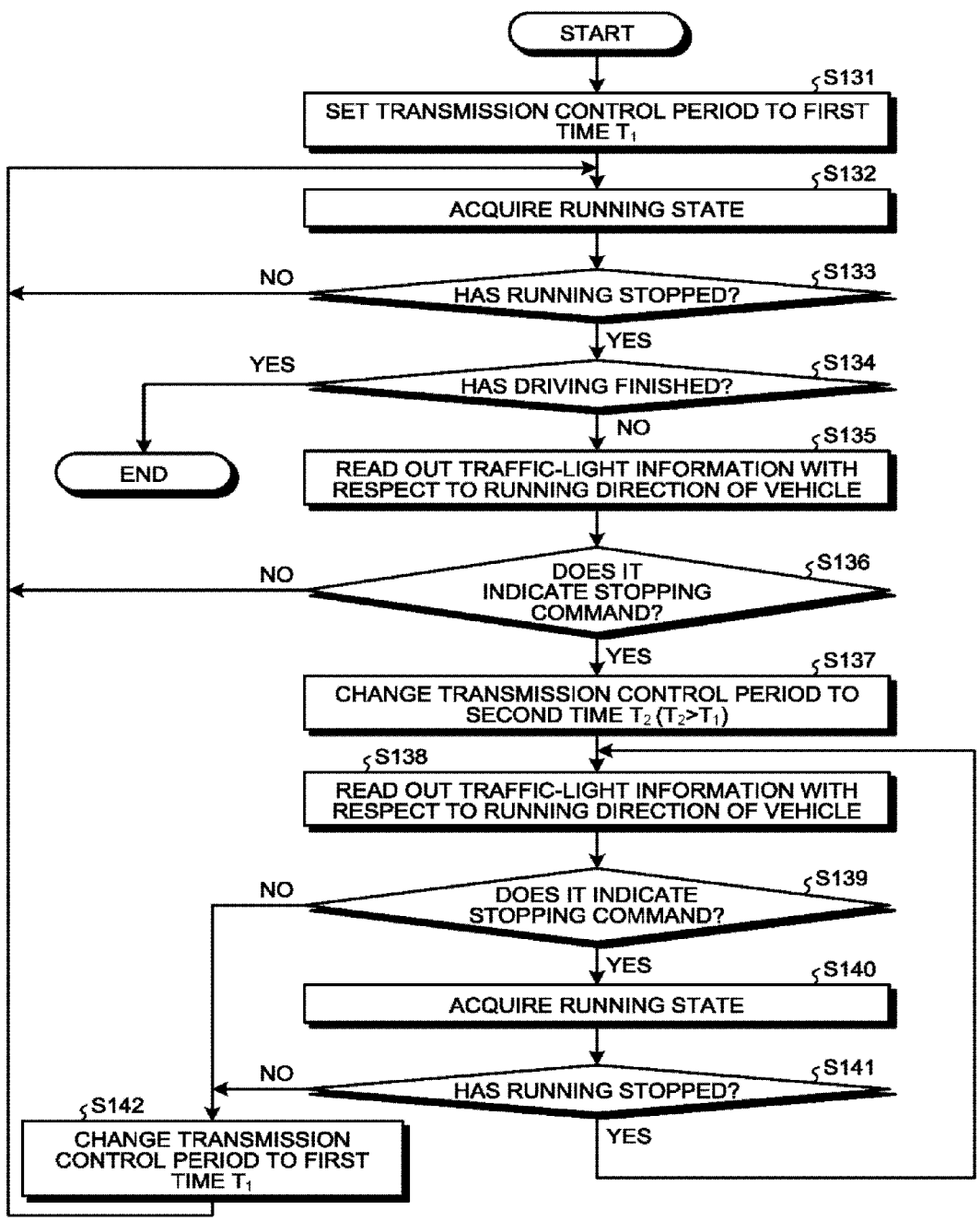
FIG. 6 is a flowchart of processes of a change unit.

FIG. 6 is a flowchart illustrating a processing flow of the change unit 60 according to the present embodiment. The change unit 60 performs the process according to the flow illustrated in FIG. 6, after driving has been started.

First, at S131, the change unit 60 sets a first time $T_1$ as the transmission control period. Accordingly, the timing control unit 44 can cause the vehicle information to be transmitted at the transmission timing, which is a timing in which the random waiting time is added to the first time $T_1$.

Subsequently, at S132, the change unit 60 acquires the running state of the vehicle. Next, at S133, the change unit 60 determines whether running of the vehicle has stopped. If the running of the vehicle has not stopped (NO at S133), the vehicle communication device 22 returns the process to S132 and waits until the running of the vehicle has stopped.

If the running of the vehicle has stopped (YES at S133), the change unit 60 forwards the process to S134. At S134, the change unit 60 determines whether driving has finished. If driving has finished (YES at S134), the change unit 60 finishes this flow. If driving has not finished (NO at S134), the change unit 60 forwards the process to S135.

At S135, the change unit 60 reads out the traffic-light information with respect to the running direction of the vehicle from the traffic-light-information storage unit 58. Next, at S136, the change unit 60 determines whether the traffic-light information with respect to the running direction of the vehicle indicates a stopping command. If the traffic-light information with respect to the running direction of the vehicle does not indicate a stopping command (NO at S136), the change unit 60 returns the process to S132, to repeat the process from S132.

If the running of the vehicle has stopped (YES at S133), driving of the vehicle has not finished (NO at S134), and the traffic-light information with respect to the running direction of the vehicle indicates the stopping command (YES at S136), the change unit 60 forwards the process to S137. At S137, the change unit 60 changes the transmission control period from the first time $T_1$ to a second time $T_2$. The second time $T_2$ is longer than the first time $T_1$. Accordingly, the timing control unit 44 can cause the vehicle information to be transmitted at the transmission timing in which a random waiting time is added to the second time $T_2$ longer than the first time $T_1$.

Subsequently, at S138, the change unit 60 reads out the traffic-light information with respect to the running direction of the vehicle from the traffic-light-information storage unit 58. Next, at S139, the change unit 60 determines whether the traffic-light information with respect to the running direction of the vehicle indicates a stopping command. If the traffic-light information with respect to the running direction of the vehicle does not indicate a stopping command (NO at S139), the change unit 60 forwards the process to S142. If the traffic-light information with respect to the running direction of the vehicle indicates a stopping command (YES at S139), the change unit 60 forwards the process to S140.

At S140, the change unit 60 acquires the running state of the vehicle. Next, at S141, the change unit 60 determines whether the running of the vehicle has stopped. If the running of the vehicle has not stopped (NO at S141), the change unit 60 forwards the process to S142. If the running of the vehicle has stopped (YES at S141), the change unit 60 returns the process to S138 to repeat the process from S138.

At S142, the change unit 60 returns the transmission control period from the second time $T_2$ to the first time $T_1$. That is, after the transmission control period has been changed to the second time $T_2$ (after the process at S137), if the traffic-light information with respect to the running direction of the vehicle has been changed from the stopping command, or if the vehicle has started running (NO at S139, or NO at S141), the change unit 60 returns the transmission control period to the first time $T_1$. Accordingly, the timing control unit 44 can cause the vehicle information to be transmitted at the transmission timing in which the random waiting time is added to the first time $T_1$, if the traffic-light information indicates a command other than the stopping command or running of the vehicle has started. After the process at S142 has finished, the change unit 60 returns the process to S132 to repeat the process from S132.

Figure 7:
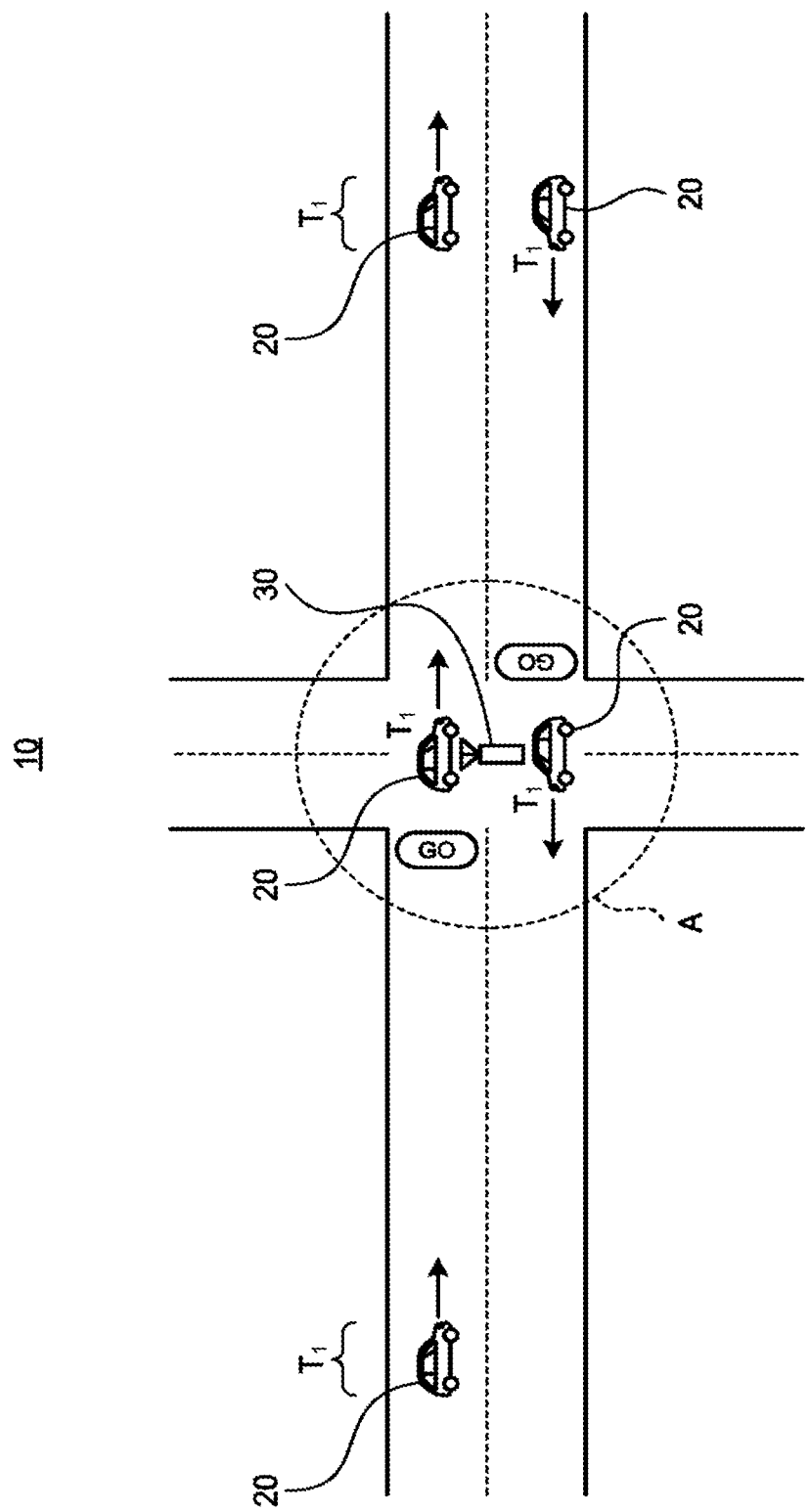
FIG. 7 is a diagram illustrating a transmission control period of vehicle information in a case where a running command is indicated.
Figure 8:
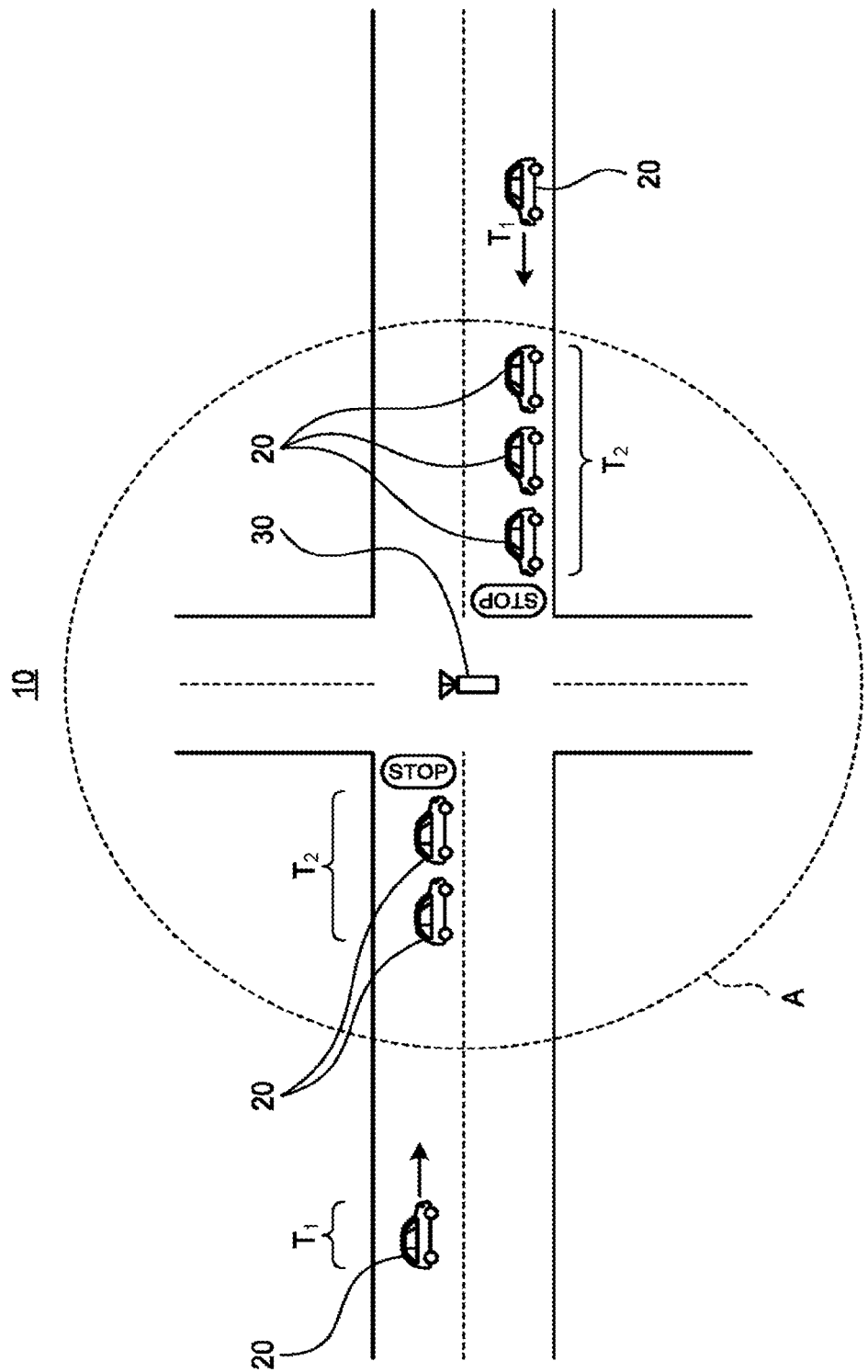
FIG. 8 is a diagram illustrating a transmission control period of vehicle information in a case where a stopping command is indicated.

FIG. 7 is a diagram illustrating a transmission control period of vehicle information of the vehicle 20 that runs near a traffic light, in a case where the traffic light indicates a running command. FIG. 8 is a diagram illustrating a transmission control period of vehicle information of the vehicle 20 that runs near a traffic light, in a case where the traffic light indicates a stopping command.

As illustrated in FIG. 7, if there are not many vehicles 20 stopping at the intersection, the communication within the communication area A of the roadside unit 30 is not congested. Therefore, even if the transmission control period of the vehicle information is the first time $T_1$, the vehicle 20 can receive the information transmitted form the roadside unit 30 or other vehicles 20 in a higher rate.

However, if many vehicles 20 are stopping at the intersection, the communication within the communication area A of the roadside unit 30 becomes congested. Therefore, when the transmission control period of the vehicle information is the first time $T_1$, a reception rate that the vehicle 20 can receive the information transmitted form the roadside unit 30 or other vehicles 20 decreases.

Therefore, in the present embodiment, as illustrated in FIG. 8, if the traffic light indicates a stopping command and the vehicle 20 is stopping (or the speed of the vehicle is equal to or lower than a preset speed), the vehicle 20 changes the transmission control period of the vehicle information to the second time $T_2$ longer than the first time $T_1$. Consequently, the traffic control system 10 according to the present embodiment can suppress communication congestion at the intersection. Therefore, according to the traffic control system 10, reception success rate of information at the intersection in the vehicle 20 and the roadside unit 30 can be improved.

Furthermore, when the vehicle is stopping, there is little change in the running state, and thus the contents of the vehicle information have little change. Therefore, even if the transmission frequency of the vehicle information is set to be lower than a normal time, the traffic control system 10 can provide to other vehicles the information similar to the information as compared to the case where the vehicle information is transmitted at a higher frequency.

In the present embodiment, the change unit 60 can set the second time $T_2$ to a time sufficiently longer than the time during which the traffic light is presenting a stopping command (for example, an infinite time). Accordingly, in the period in which the traffic light is presenting a stopping command, the change unit 60 can stop transmission of the vehicle information. That is, if the traffic light indicates a stopping command and the vehicle 20 is stopping (or the speed of the vehicle is equal to or lower than a preset speed), the change unit 60 can stop transmission of the vehicle information.

First Modification

Figure 9:
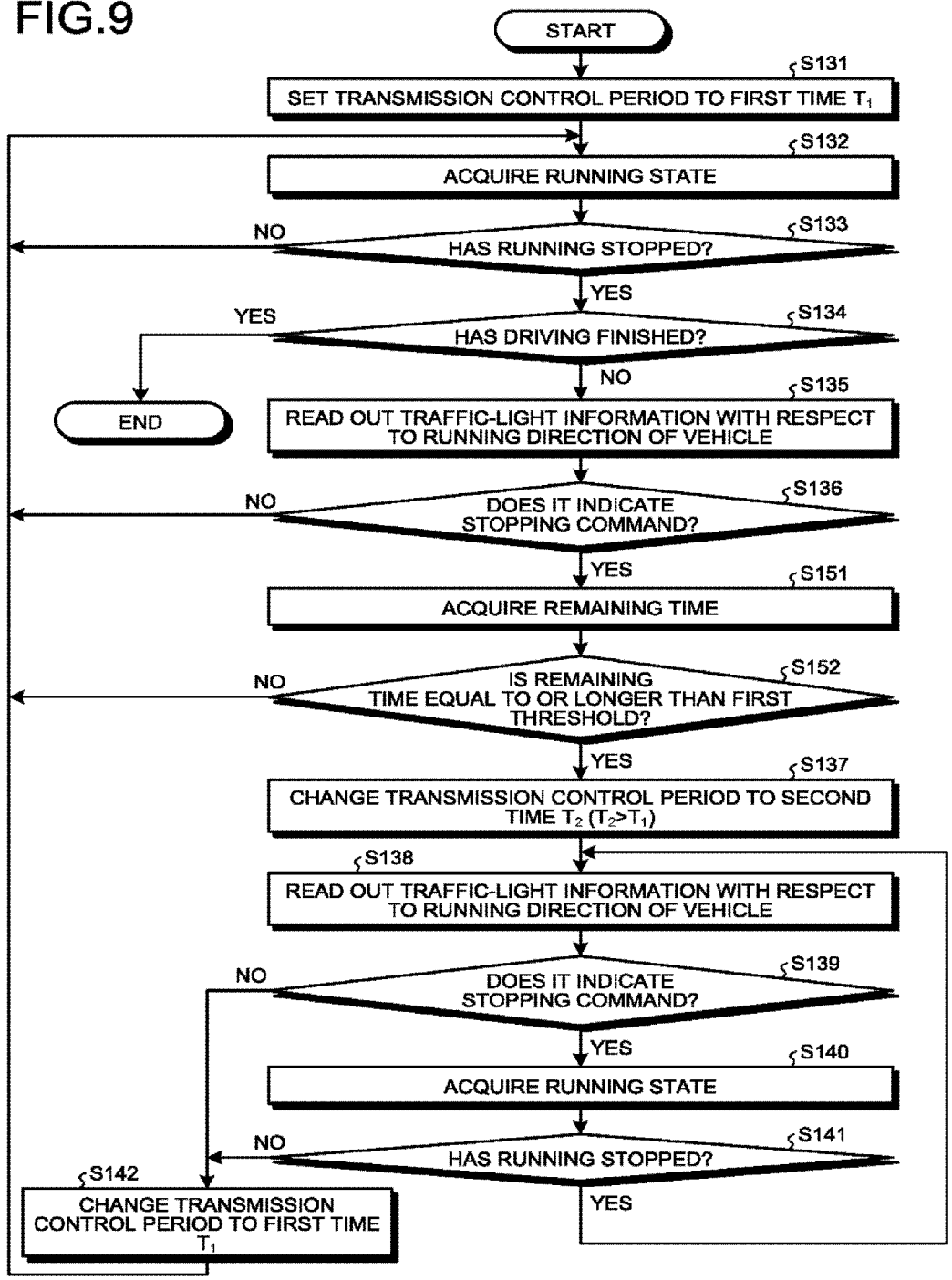
FIG. 9 is a flowchart of processes of a change unit according to a first modification.

FIG. 9 is a flowchart illustrating a processing flow of the change unit 60 according to a first modification.

The processing flow of the change unit 60 according to the first modification is described next with reference to FIG. 9. While the processing in the change unit 60 according to the first modification is different from the flow illustrated in FIG. 6 in that the processes at S151 and S152 are added, other processes are the same as those in FIG. 6.

Upon determination that the traffic-light information with respect to the running direction of the vehicle indicates a stopping command at S136 (YES at S136), the change unit 60 forwards the process to S151. At S151, the change unit 60 acquires a remaining time until switching to the next command from the traffic-light information with respect to the running direction of the vehicle.

Subsequently, at S152, the change unit 60 determines whether the remaining time is equal to or longer than a preset first threshold. If the remaining time is not equal to or longer than the preset first threshold (NO at S152), the change unit 60 returns the process to S132, to repeat the process from S132. Accordingly, if the remaining time while the traffic-light information indicates the stopping command is short, the timing control unit 44 can maintain the transmission interval of the vehicle information as usual, without prolonging the transmission interval.

If the remaining time is equal to or longer than the preset first threshold (YES at 3152), the change unit 60 forwards the process to S137. That is, if the remaining time is equal to or longer than the preset first threshold (YES at S152), running of the vehicle has stopped (YES at S133), driving of the vehicle has not finished (NO at S134), and the traffic-light information with respect to the running direction of the vehicle indicates a stopping command (YES at S136), the change unit 60 forwards the process to S137. Accordingly, if the remaining time while the traffic-light information indicates the stopping command is sufficiently long, the change unit 60 can prolong the transmission interval of the vehicle information more than usual.

In this manner, according to the traffic control system 10 of the present modification, even if the running of the vehicle has stopped and traffic-light information with respect to the running direction of the vehicle indicates a stopping command, if the remaining time while the traffic-light information indicates the stopping command is short, switching of the transmission interval of the vehicle information can be eliminated. Due to this configuration, according to the traffic control system 10 of the present modification, switching of setting in a short period of time can be eliminated, thereby enabling to suppress a complicated process.

Second Modification

Figure 10:
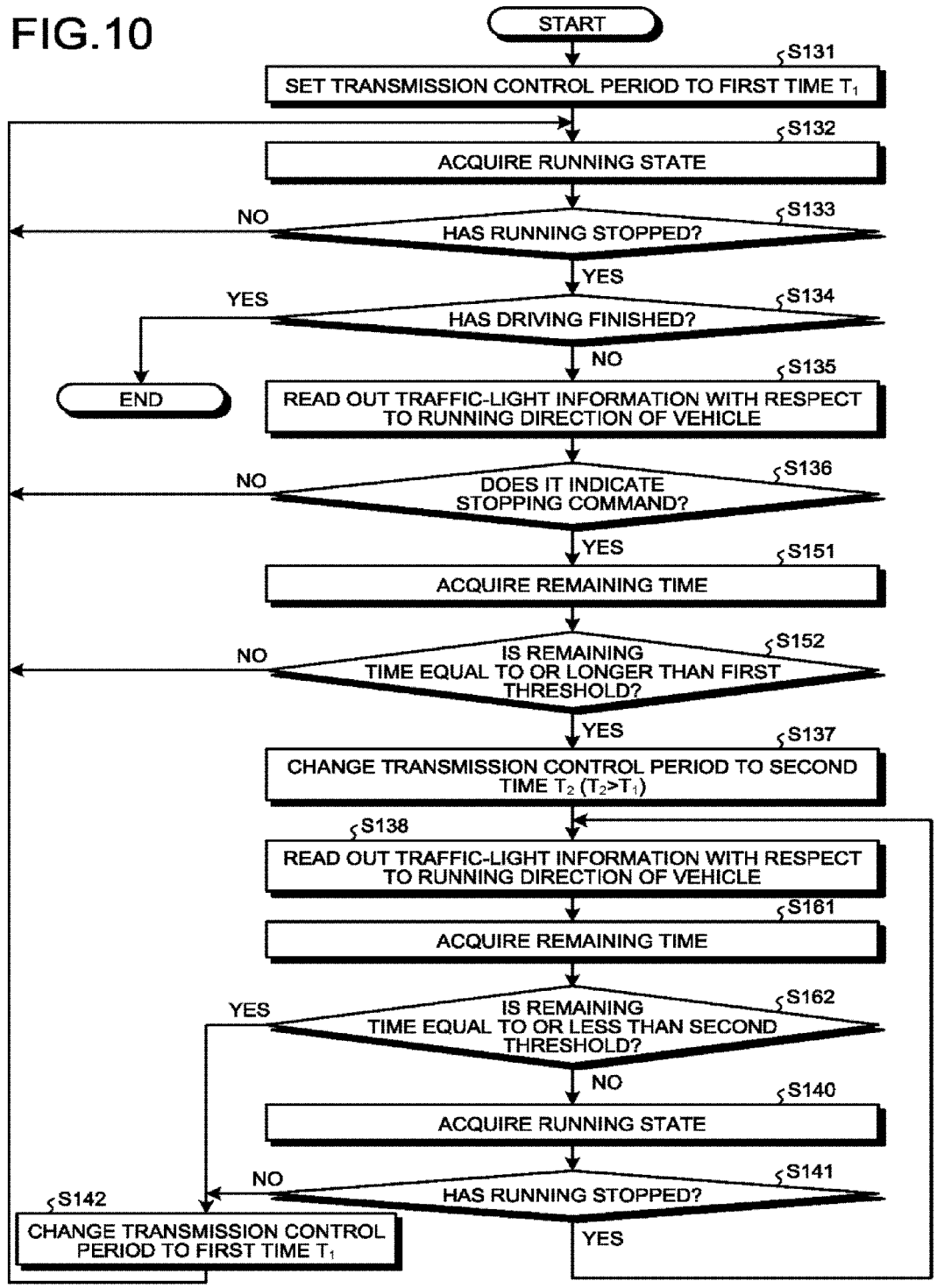
FIG. 10 is a flowchart of processes of a change unit according to a second modification.

FIG. 10 is a flowchart illustrating a processing flow of the change unit 60 according to a second modification.

The processing flow of the change unit 60 according to the second modification is described next with reference to FIG. 10. While the processing in the change unit 60 according to the second modification is different from the flow illustrated in FIG. 9 in that the processes at S161 and S162 are added instead of S139, other processes are same as those in FIG. 9.

At S138, after the change unit 60 reads the traffic-light information with respect to the running direction of the vehicle, the change unit 60 forwards the process to S161. At S161, the change unit 60 acquires the remaining time until switching to the next command based on the traffic-light information with respect to the running direction of the vehicle. Subsequently, at S162, the change unit 60 determines whether the remaining time is equal to or longer than a preset second threshold. The second threshold is, for example, smaller than the first threshold. If the remaining time is not equal to or less than the preset second threshold (NO at S162), the change unit 60 forwards the process to S140.

If the remaining time is not equal to or less than the preset second threshold (YES at S162), the change unit 60 forwards the process to S142. That is, after the transmission control period is changed to the second time $T_2$ (after S137), if the remaining time until the traffic-light information is switched from the stopping command to another command is equal to or less than the second threshold, or the vehicle has started running (YES at S162 or NO at S141), the change unit 60 returns the transmission control period to the first time $T_1$. Accordingly, the change unit 60 can return the transmission interval of the vehicle information to the same interval as usual, before the traffic-light information is switched to the command other than the stopping command.

In this manner, the vehicle communication device 22 according to the second modification changes the transmission interval to a normal transmission interval before the traffic-light information is switched to the command other than the stopping command. According to the vehicle communication device 22 of the second modification, if the stopping command finishes and the vehicle has started running, the vehicle information can be reliably transmitted to other vehicles 20.

Third Modification

Figure 11:
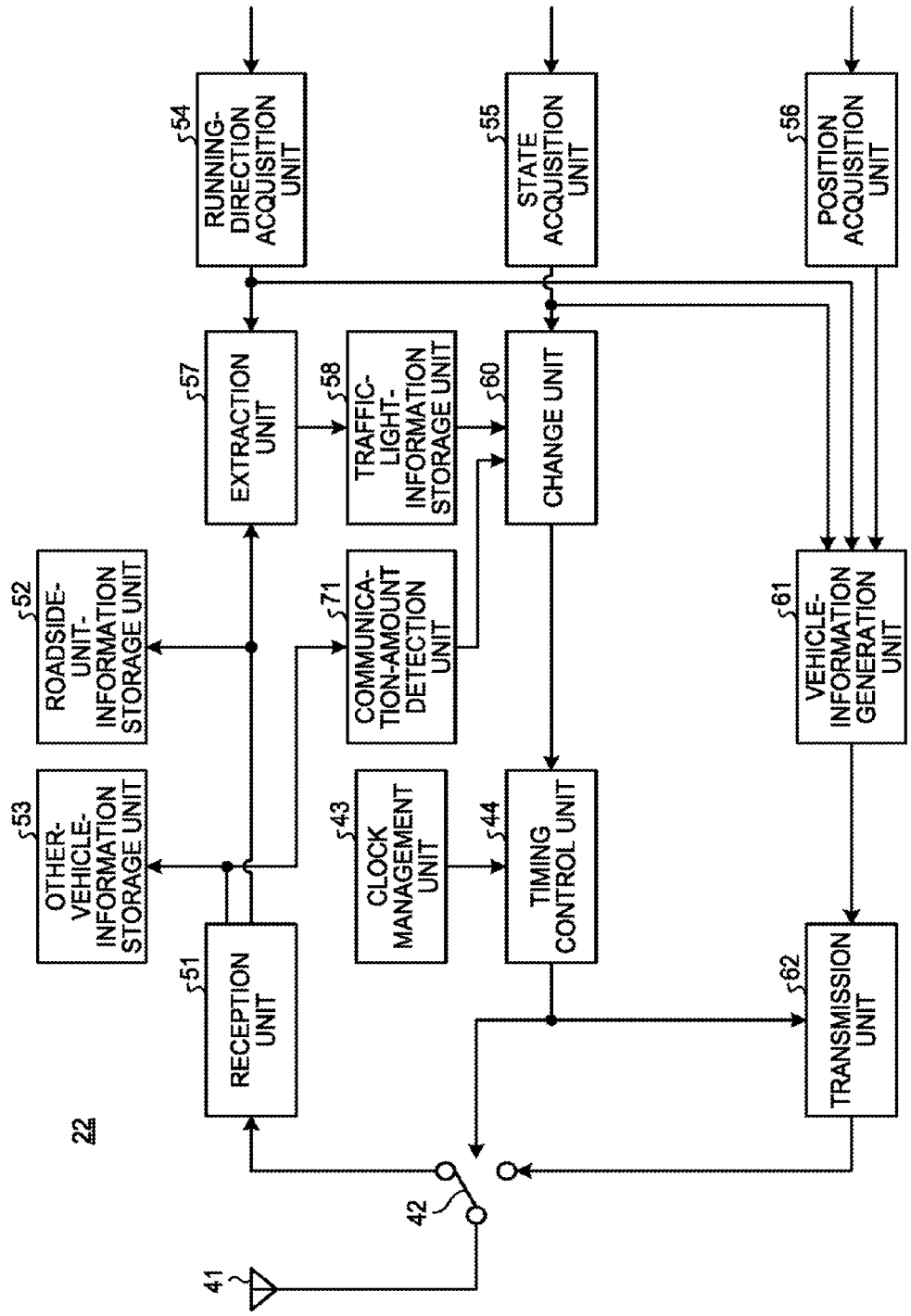
FIG. 11 is a functional configuration diagram of a vehicle communication device according to a third modification.

FIG. 11 is a functional configuration diagram of the vehicle communication device 22 according to a third modification.

The vehicle communication device 22 according to the third modification is described next. While the vehicle communication device 22 according to the third modification has a different configuration from the configuration illustrated in FIG. 3 in that a communication-amount detection unit 71 is further provided, other features are the same as those illustrated in FIG. 3.

The communication-amount detection unit 71 detects a communication amount of information being transmitted to a predetermined channel. For example, the communication-amount detection unit 71 detects a frequency of the vehicle information transmitted from other vehicles 20 within a certain period of time as the communication amount. Further, the communication-amount detection unit 71 can detect the number of vehicles 20 located in the vicinity, the number of traffic lights present at the intersection, the number of lanes at the intersection, or the like to estimate these values as the communication amount.

In the third modification, if the communication amount is equal to or larger than a predetermined amount, the traffic-light information with respect to the running direction of the vehicle indicates a stopping command, and the speed of the vehicle is equal to or lower than a preset speed, the change unit 60 changes the transmission control period to the second time. Consequently, according to the vehicle communication device 22 of the third modification, when communication at the intersection is congested, the transmission control period of the vehicle information can be prolonged than usual.

Hardware Configuration

Figure 12:
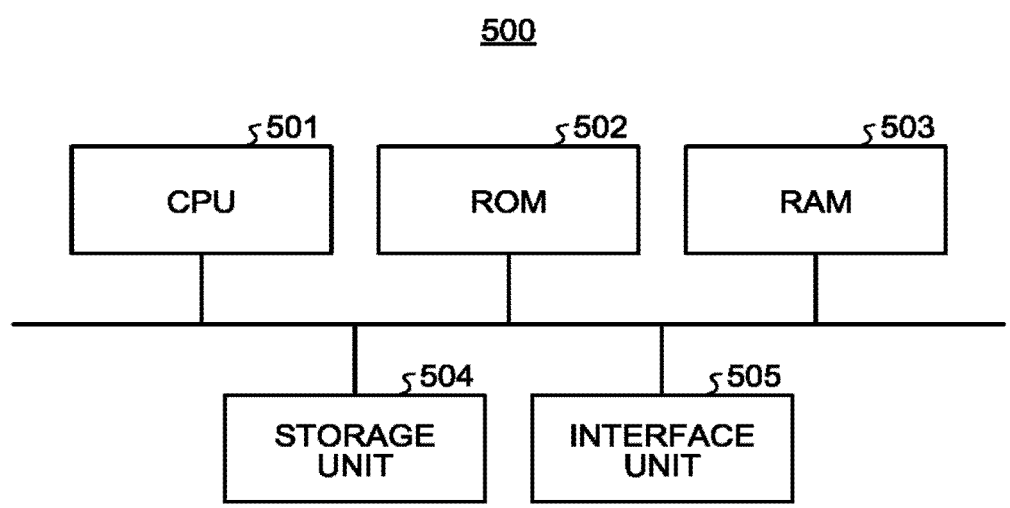
FIG. 12 is a hardware configuration diagram of an information processing unit according to the embodiment.

FIG. 12 is a diagram illustrating an example of a hardware configuration of an information processing device 500 according to the present embodiment. A part of the constituent elements of the vehicle communication device 22 described above can be realized by, for example, the information processing device 500 as illustrated in FIG. 12.

The information processing device 500 has the same configuration as that of a normal computer. That is, the information processing device 500 includes a CPU (Central Processing Unit) 501, a ROM 502, a RAM (Random Access Memory) 503, a storage unit 504, and an interface unit 505. The CPU 501, the ROM 502, the RAM 503, the storage unit 504, and the interface unit 505 are connected to each other by a bus.

The CPU 501 develops a program stored in the storage unit 504 onto the RAM 503 to execute the program, controls the respective units to perform input and output, and performs processing of data. A start program for reading out a boot program of an operating system from the storage unit 504 onto the RAM 503 is stored in the ROM 502. The RAM 503 stores therein data as a working area of the CPU 501.

The storage unit 504 is, for example, a hard disk drive or a flash memory. The storage unit 504 stores therein an operating system, an application program, and data. These programs are recorded on a computer-readable recording medium in a file of an installable format or executable format and distributed. The programs can be distributed by downloading the programs from a server. The interface unit 505 is a device for transmitting and receiving information to and from other devices.

The program executed by the information processing device 500 according to the present embodiment is provided as it is recorded in a computer-readable recording medium such as a CD-ROM, a flexible disk (FD), a CD-R, or a DVD, in a file of an installable format or executable format. Further, the program executed by the information processing device 500 according to the present embodiment can be configured such that the program is stored in a computer connected to a network such as the Internet and downloaded via the network to be provided. Alternatively, the program executed by the information processing device 500 according to the present embodiment can be configured such that the program is provided or distributed via a network such as the Internet. Furthermore, the program according to the present embodiment can be configured such that the program is incorporated in the ROM 502 or the like in advance to be provided.

The program that causes the information processing device 500 to function as the vehicle communication device 22 includes a running-direction acquisition module, a state acquisition module, a position acquisition module, an extraction module, a change module, and a vehicle-information generation module. In the information processing device 500, a processor (the CPU 501) reads out the program from a storage medium (the storage unit 504 or the like) and executes the program, thereby loading the respective modules onto a main storage unit (the RAM 503). Next, the processor (the CPU 501) functions as the running-direction acquisition unit 54, the state acquisition unit 55, the position acquisition unit 56, the extraction unit 57, the change unit 60, and the vehicle-information generation unit 61. A part or all of the running-direction acquisition unit 54, the state acquisition unit 55, the position acquisition unit 56, the extraction unit 57, the change unit 60, and the vehicle-information generation unit 61 can be realized by the hardware other than the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that is provided in a movable body and is wirelessly communicable with a transceiver unit and with another movable body via a predetermined channel, the communication device comprising:
    a receiver configured to receive transceiver unit information including traffic-light information that the transceiver unit has transmitted to the predetermined channel;
    a transmitter configured to transmit movable body information on the movable body to the predetermined channel; and
    processing circuitry configured to:
        extract the traffic-light information corresponding to a running direction of the movable body from the transceiver unit information;
        control a transmission timing of the movable body information in such a manner that a transmission control period becomes a preset first time; and
        change the transmission control period to a second time that is longer than the first time, when the traffic-light information with respect to the running direction of the movable body indicates a stopping command, and a speed of the movable body is equal to or lower than a preset speed.

2. The communication device according to claim 1, wherein the processing circuitry changes the transmission control period of the movable body information to the second time, when the traffic-light information with respect to the running direction of the movable body indicates a stopping command, and the movable body is stopping.

3. The communication device according to claim 1, wherein the processing circuitry adds a random waiting time to a transmission interval of the movable body information.

4. The communication device according to claim 1, wherein
    the processing circuitry is further configured to generate the movable body information including a running state of the movable body.

5. The communication device according to claim 1, wherein
    the traffic-light information includes a remaining time until switching to a next command, and
    the processing circuitry changes the transmission control period to the second time, when the remaining time is equal to or longer than a first threshold, the traffic-light information with respect to the running direction of the movable body indicates a stopping command, and the speed of the movable body is equal to or lower than a preset speed.

6. The communication device according to claim 5, wherein the processing circuitry returns the transmission control period to the first time, when the remaining time becomes equal to or less than a second threshold after the transmission control period is changed to the second time.

7. The communication device according to claim 1, wherein
    the processing circuitry is further configured to detect a communication amount of information being transmitted to the predetermined channel, and
    the processing circuitry changes the transmission control period to the second time, when the communication amount is equal to or larger than a predetermined amount, the traffic-light information with respect to the running direction of the movable body indicates a stopping command, and the speed of the movable body is equal to or lower than a preset speed.

8. The communication device according to claim 1, wherein the processing circuitry stops transmission of the movable body information, when the traffic-light information with respect to the running direction of the movable body indicates a stopping command, and the speed of the movable body is equal to or lower than a preset speed.

9. A communication method executed by a communication device that is provided in a movable body and is wirelessly communicable with a transceiver unit and with another movable body via a predetermined channel, the communication method comprising:
    receiving transceiver unit information including traffic-light information that the transceiver unit has transmitted to the predetermined channel;
    extracting the traffic-light information corresponding to a running direction of the movable body from the transceiver unit information;
    transmitting movable body information on the movable body to the predetermined channel;
    controlling a transmission timing of the movable body information in such a manner that a transmission control period becomes a preset first time; and
    changing the transmission control period to a second time that is longer than the first time, when the traffic-light information with respect to the running direction of the movable body indicates a stopping command, and a speed of the movable body is equal to or lower than a preset speed.

10. The communication method according to claim 9, wherein the changing includes changing the transmission control period of the movable body information to the second time, when the traffic-light information with respect to the running direction of the movable body indicates a stopping command, and the movable body is stopping.

11. The communication method according to claim 9, wherein the controlling includes adding a random waiting time to a transmission interval of the movable body information.

12. The communication method according to claim 9, further comprising generating the movable body information including a running state of the movable body.

13. The communication method according to claim 9, wherein
the traffic-light information includes a remaining time until switching to a next command, and
the changing includes changing the transmission control period to the second time, when the remaining time is equal to or longer than a first threshold, the traffic-light information with respect to the running direction of the movable body indicates a stopping command, and the speed of the movable body is equal to or lower than a preset speed.

14. The communication method according to claim 13, wherein the changing includes returning the transmission control period to the first time, when the remaining time becomes equal to or less than a second threshold after the transmission control period is changed to the second time.

15. The communication method according to claim 9, further comprising detecting a communication amount of information being transmitted to the predetermined channel, wherein
the changing includes changing the transmission control period to the second time, when the communication amount is equal to or larger than a predetermined amount, the traffic-light information with respect to the running direction of the movable body indicates a stopping command, and the speed of the movable body is equal to or lower than a preset speed.

16. The communication method according to claim 9, wherein the changing includes stopping transmission of the movable body information, when the traffic-light information with respect to the running direction of the movable body indicates a stopping command, and the speed of the movable body is equal to or lower than a preset speed.

* * * * *